United States Patent
Hall et al.

(10) Patent No.: US 7,426,968 B2
(45) Date of Patent: Sep. 23, 2008

(54) DRILL BIT ASSEMBLY WITH A PROBE

(76) Inventors: David R. Hall, 2185 S. Larsen Pkwy., Provo, UT (US) 84606; Francis Leany, 2185 S. Larsen Pkwy., Provo, UT (US) 84606; Paula Turner, 2185 S. Larsen Pkwy., Provo, UT (US) 84606; Christopher Durrand, 2185 S. Larsen Pkwy., Provo, UT (US) 84606; David Lundgreen, 2185 S. Larsen Pkwy., Provo, UT (US) 84606; Daryl Wise, 2185 S. Larsen Pkwy., Provo, UT (US) 84606

( * ) Notice: Subject to any disclaimer, the term of this patent is extended or adjusted under 35 U.S.C. 154(b) by 345 days.

(21) Appl. No.: 11/278,935

(22) Filed: Apr. 6, 2006

(65) Prior Publication Data
US 2007/0114061 A1    May 24, 2007

Related U.S. Application Data

(63) Continuation-in-part of application No. 11/277,394, filed on Mar. 24, 2006, now Pat. No. 7,398,837, which is a continuation-in-part of application No. 11/277,380, filed on Mar. 24, 2006, now Pat. No. 7,337,858, which is a continuation-in-part of application No. 11/306,976, filed on Jan. 18, 2006, now Pat. No. 7,360,610, which is a continuation-in-part of application No. 11/306,307, filed on Dec. 22, 2005, now Pat. No. 7,225,886, which is a continuation-in-part of application No. 11/306,022, filed on Dec. 14, 2005, now Pat. No. 7,198,119, which is a continuation-in-part of application No. 11/164,391, filed on Nov. 21, 2005, now Pat. No. 7,270,196.

(51) Int. Cl.
*E21B 47/01*    (2006.01)

(52) U.S. Cl. .................................... 175/40; 175/50
(58) Field of Classification Search ............ 175/40, 175/50, 20
See application file for complete search history.

(56) References Cited

U.S. PATENT DOCUMENTS

| | | | |
|---|---|---|---|
| 465,103 | A | 12/1891 | Wegner |
| 616,118 | A | 12/1898 | Kunhe |
| 946,060 | A | 1/1910 | Looker |
| 1,116,154 | A | 11/1914 | Stowers |
| 1,183,630 | A | 5/1916 | Bryson |
| 1,189,560 | A | 7/1916 | Gondos |
| 1,360,908 | A | 11/1920 | Everson |
| 1,387,733 | A | 8/1921 | Midgett |
| 1,460,671 | A | 7/1923 | Hebsacker |
| 1,544,757 | A | 7/1925 | Hufford |
| 1,821,474 | A | 9/1931 | Mercer |
| 2,054,255 | A | 9/1936 | Howard |

(Continued)

*Primary Examiner*—Hoang Dang
(74) *Attorney, Agent, or Firm*—Tyson J. Wilde

(57) ABSTRACT

The current invention discloses a drill bit assembly with a body portion intermediate a shank portion and a working portion. The working portion may have at least one cutting element. The drill bit assembly may also have a shaft with a first end disposed within the assembly, a second end of the shaft may protrude from the working portion and at least one probe may be disposed within the shaft.

22 Claims, 16 Drawing Sheets

U.S. PATENT DOCUMENTS

| | | |
|---|---|---|
| 2,169,223 A | 8/1939 | Christian |
| 2,218,130 A | 10/1940 | Court |
| 2,320,136 A | 5/1943 | Kammerer |
| 2,466,991 A | 4/1949 | Kammerer |
| 2,540,464 A | 2/1951 | Stokes |
| 2,544,036 A | 3/1951 | Kammerer |
| 2,755,071 A | 7/1956 | Kammerer |
| 2,901,223 A | 8/1959 | Scott |
| 2,963,102 A | 12/1960 | Smith |
| 3,058,532 A * | 10/1962 | Alder .......................... 175/39 |
| 3,139,147 A * | 6/1964 | Hays et al. ................. 175/233 |
| 3,379,264 A | 4/1968 | Cox |
| 3,455,158 A * | 7/1969 | Richter, Jr. et al. ....... 73/152.03 |
| 3,493,165 A | 2/1970 | Schonfield |
| 3,960,223 A | 6/1976 | Kleine |
| 4,081,042 A | 3/1978 | Johnson |
| 4,106,577 A | 8/1978 | Summer |
| 4,307,786 A | 12/1981 | Evans |
| 4,416,339 A | 11/1983 | Baker |
| 4,448,269 A | 5/1984 | Ishikawa |
| 4,531,592 A | 7/1985 | Hayatdavoudi |
| 4,566,545 A | 1/1986 | Story |
| 4,583,592 A * | 4/1986 | Gazda et al. ........... 166/250.07 |
| 4,962,822 A | 10/1990 | Pascale |
| 5,009,273 A | 4/1991 | Grabinski |
| 5,038,873 A | 8/1991 | Jurgens |
| 5,141,063 A | 8/1992 | Quesenbury |
| 5,361,859 A | 11/1994 | Tibbitts |
| 5,417,292 A | 5/1995 | Polakoff |
| 5,507,357 A | 4/1996 | Hult |
| 5,560,440 A | 10/1996 | Tibbitts |
| 5,568,838 A | 10/1996 | Struthers |
| 5,678,644 A | 10/1997 | Fielder |
| 5,896,938 A | 4/1999 | Moeny |
| 5,901,113 A * | 5/1999 | Masak et al. .................. 367/57 |
| 6,047,239 A * | 4/2000 | Berger et al. .................... 702/9 |
| 6,202,761 B1 | 3/2001 | Forney |
| 6,439,326 B1 | 7/2002 | Huang |
| 6,533,050 B2 | 3/2003 | Molloy |
| 6,601,454 B1 | 8/2003 | Botnan |
| 6,668,949 B1 | 12/2003 | Rives |
| 6,732,817 B2 | 5/2004 | Dewey |
| 9,629,076 | 4/2005 | Fanuel |
| 6,953,096 B2 | 10/2005 | Glenhill |

* cited by examiner

2000

```
┌─────────────────────────────────────────────────────────────┐
│ providing a drill bit assembly having a body portion        │
│ intermediate a shank portion and a working portion          │
│                                                        2001 │
└─────────────────────────────────────────────────────────────┘
                              │
┌─────────────────────────────────────────────────────────────┐
│ providing a shaft comprising an end substantially protruding│
│ from the working portion and the shaft also having at least │
│                    one probe                          2002  │
└─────────────────────────────────────────────────────────────┘
                              │
┌─────────────────────────────────────────────────────────────┐
│ using the probe to determine downhole parameters            │
│                                                        2003 │
└─────────────────────────────────────────────────────────────┘
```

Fig. 21

```
2100    ┌──────────────────────────────────────────────────┐
        │ providing a drill bit assembly with a shaft comprising an │
        │ end substantially protruding from a working portion and the │
        │      shaft also having at least one probe    2101 │
        └──────────────────────────────────────────────────┘
                              │
        ┌──────────────────────────────────────────────────┐
        │ isolating the probe from the annulus pressure by forming a │
        │ mechanical seal with the shaft and a subsurface formation │
        │                                              2102 │
        └──────────────────────────────────────────────────┘
                              │
        ┌──────────────────────────────────────────────────┐
        │ retrieving a sample of the formation by retracting the probe │
        │               within the shaft             2103 │
        └──────────────────────────────────────────────────┘
                              │
        ┌──────────────────────────────────────────────────┐
        │ analyzing the sample within the shaft with at least one │
        │                   sensor                    2104 │
        └──────────────────────────────────────────────────┘
```

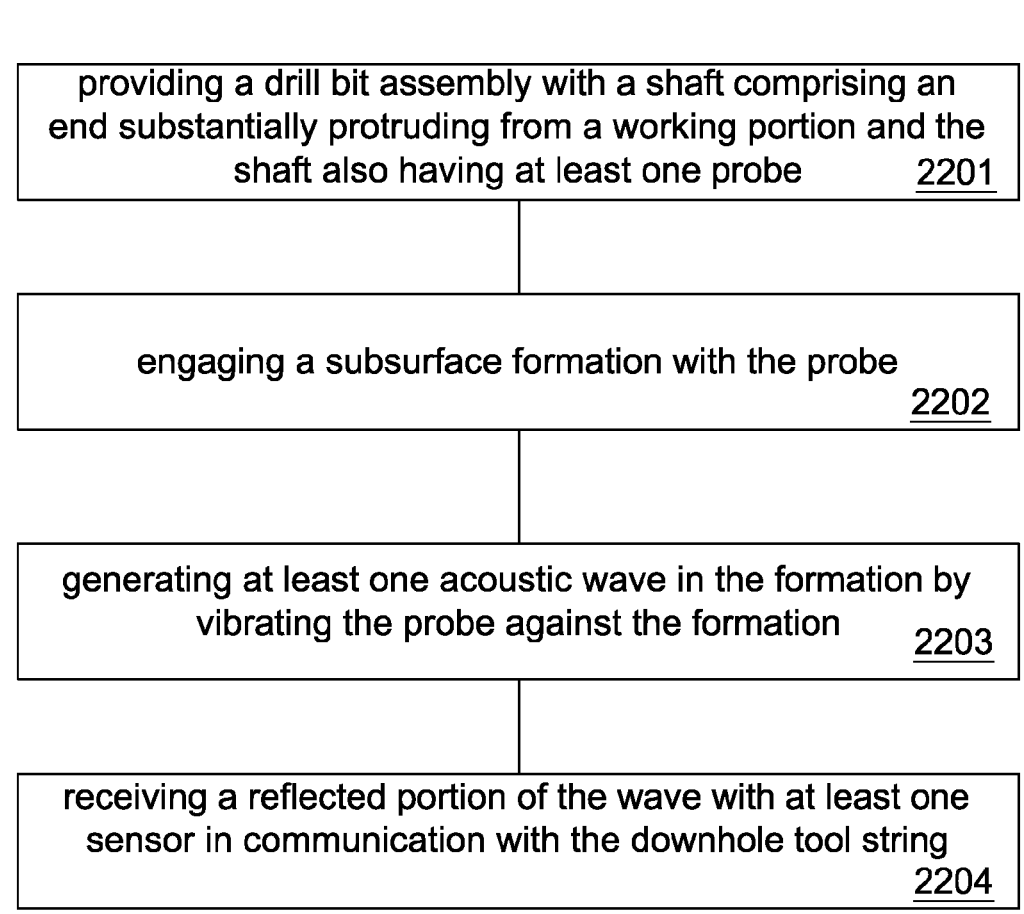

providing a drill bit assembly with a shaft comprising an end substantially protruding from a working portion and the shaft also having at least one probe   2201 engaging a subsurface formation with the probe
2202 generating at least one acoustic wave in the formation by vibrating the probe against the formation   2203 receiving a reflected portion of the wave with at least one sensor in communication with the downhole tool string
2204

```
providing a drill bit assembly with a shaft comprising an
end substantially protruding from a working portion and the
shaft also having at least one probe          2301
```

```
electrically isolating at least a portion of the probe from the
drill bit assembly
                                               2302
```

```
forcing a current into the subsurface formation through the
probe
                                               2303
```

```
receiving the current with at least one sensor in
communication with the downhole tool strin.   2304
```

Fig. 24

DRILL BIT ASSEMBLY WITH A PROBE

CROSS REFERENCE TO RELATED APPLICATIONS

This Patent Application is a continuation-in-part of U.S. patent application Ser. No. 11/277,394 which filed on Mar. 24, 2006 now U.S. Pat. No. 7,398,837 and entitled Drill Bit Assembly with a Logging Device. U.S. patent application Ser. No. 11/277,394 is a continuation-in-part of U.S. patent application Ser. No. 11/277,380 also filed on Mar. 24, 2006 now U.S. Pat. No. 7,337,858 and entitled A Drill Bit Assembly Adapted to Provide Power Downhole. U.S. patent application Ser. No. 11/277,380 is a continuation-in-part of U.S. patent application Ser. No. 11/306,976 which was filed on Jan. 18, 2006 now U.S. Pat. No. 7,360,610 and entitled "Drill Bit Assembly for Directional Drilling." U.S. patent application Ser. No. 11/306,976 is a continuation-in-part of U.S. patent application Ser. No. 11/306,307 filed on Dec. 22, 2005 now U.S. Pat. No. 7,225,886, entitled Drill Bit Assembly with an Indenting Member. U.S. patent application Ser. No. 11/306,307 is a continuation-in-part of U.S. patent application Ser. No. 11/306,022 filed on Dec. 14, 2005 now U.S. Pat. No. 7,198,119, entitled Hydraulic Drill Bit Assembly. U.S. patent application Ser. No. 11/306,022 is a continuation-in-part of U.S. patent application Ser. No. 11/164,391 filed on Nov. 21, 2005 now U.S. Pat. No. 7,270,196, which is entitled Drill Bit Assembly. All of these applications are herein incorporated by reference in their entirety.

BACKGROUND OF THE INVENTION

The present invention relates to the field of downhole drilling for oil, gas, and geothermal exploration. With a continually increasing demand for downhole drilling, the ability to drill more effectively through the use of electronics in a drill string has become more popular. Such electronics may be used to determine the direction of drilling, monitor the condition of the drilling equipment, and determine subsurface formation parameters.

U.S. patent publication 20050230149 which is herein incorporated by reference for all that it contains, discloses a method and apparatus for multiplexing data on-bit in a drilling operation. The apparatus comprises a bit; a plurality of transducers situated on the bit; and an analog multiplexer situated on the bit and capable of receiving the output of the transducers, multiplexing the received outputs, and transmitting the multiplexed outputs. The method comprises taking a plurality of measurements of at least one down-hole drilling condition at a bit of a drill string; generating a plurality of analog signals representative of the measurements; and multiplexing the analog signals at the bit.

U.S. Pat. No. 6,729,399 which is herein incorporated by reference for all that it contains, discloses a downhole tool for collecting data from a subsurface formation. The tool is provided with a probe for testing and/or sampling an adjacent formation. The tool is also provided with a protector positioned about the probe for engaging and protecting the sidewall of the bore hole surrounding the probe. The protector prevents deterioration of the wellbore during the testing and/or sampling by the probe.

U.S. Pat. No. 6,964,301 which is herein incorporated by reference for all that it contains, discloses apparatuses and methods for extracting fluid from a subsurface formation. A downhole sampling tool with a probe having an internal wall capable of selectively diverting virgin fluids into virgin flow channels for sampling, while diverting contaminated fluids into contaminated flow channels to be discarded. The characteristics of the fluid passing through the channels of the probe may be measured. The data generated during sampling may be sent to a controller capable of generating data, communicating and/or sending command signals. The flow of fluid into the downhole tool may be selectively adjusted to optimize the flow of fluid into the channels by adjusting the internal wall within the probe and/or by adjusting the flow rates through the channels. The configuration of the internal wall and/or the flow rates may be automatically adjusted by the controller and/or manually manipulated to further optimize the fluid flow.

U.S. Pat. No. 6,986,282 which is herein incorporated by reference for all that it contains, discloses a method and apparatus to collect downhole data during a drilling operation via a downhole tool. A differential pressure is created by the difference between internal pressure of fluid passing through the downhole tool and the annular pressure in the wellbore. The apparatus includes a drill collar connectable to the downhole drilling, and has an opening extending into a chamber therein. A piston is positioned in the chamber and has a rod extending into the opening. The piston is movable between a closed position with the rod filling the opening, and an open position with the rod retracted into the chamber to form a cavity for receiving downhole fluid. A sensor is positioned in the rod for collecting data from fluid in the cavity. The apparatus may also be provided with a probe and/or hydraulic circuitry to facilitate the collection of data.

U.S. Pat. No. 6,568,487 which is herein incorporated by reference for all that it contains, discloses a tool for obtaining at least one parameter of interest of a subterranean formation in-situ, the tool comprising a carrier member, a selectively extendable member mounted on the carrier for isolating a portion of annulus, a port exposable to formation fluid in the isolated annulus space, a piston integrally disposed within the extendable member for urging the fluid into the port, and a sensor operatively associated with the port for detecting at least one parameter of interest of the fluid.

BRIEF SUMMARY OF THE INVENTION

In one aspect of the present invention a drill bit assembly has a body portion intermediate a shank portion and a working portion. The working portion has at least one cutting element. The drill bit assembly may have a shaft with a distal end protruding from the working portion. The shaft may have at least one probe disposed within the shaft. The probe may be extendable from the shaft. This may allow the probe to engage a subsurface formation. A proximate end of the probe may be attached to an actuator. The actuator may excite the probe to produce an acoustic wave, seismic wave, sonic wave, or combinations thereof. The drill bit assembly may further comprise a sonic receiver, acoustic receiver, seismic receiver or combinations thereof. The receivers may be connected to a downhole network. The pathway in which the probe is disposed may connect to a fluid channel which comprises a fluid pressure sensor. The sensor may be used to measure the formation pressure, annular pressure, and combinations thereof. The probe may be substantially coaxial with the shaft. Probe may be electrically isolated from the shaft, body portion, working portion, and/or a resistivity sensor. This may allow the probe to emit or induce current into the formation so that the resistivity of the formation may be determined.

In another aspect of the invention, a method for downhole data acquisition may comprise the steps of providing a drill bit assembly having a body portion intermediate a shank portion and a working portion; providing a shaft with an end protruding from the working portion and the shaft also having at least one probe; and using the probe to determine downhole parameters. A proximate end of the probe may be attached to an actuator. The actuator may send acoustic, seismic, and/or sonic signals into the formation through the probe. Acoustic, sonic, and/or seismic reflections may be detected by a sensor attached to the drill bit assembly, on a downhole tool string, in an adjacent well, or at the surface. The probe may contact the subsurface formation within a mechanical seal formed between the subsurface formation and the shaft. Creating a mechanical seal between the shaft and the subsurface formation may allow a more accurate formation pressure reading to be taken. The probe may be adapted to draw fluid from the subsurface formation into the shaft and/or drill bit assembly. The probe may also be adapted to measure annulus pressure within a borehole.

In yet another aspect of the invention, a system includes a drill bit assembly attached to a string of downhole components; the drill bit assembly has a body portion intermediate a shank portion and a working portion; the working portion has at least on cutting element; a shaft with an end protruding from the working portion; and at least one probe disposed within the shaft.

BRIEF DESCRIPTION OF THE DRAWINGS

FIG. 21 is a block diagram of an embodiment of a method for downhole data acquisition.

FIG. 22 is a block diagram of an embodiment of a method for determining a downhole parameter from a subsurface formation.

FIG. 23 is a block diagram of another embodiment of a method for determining a downhole parameter from a subsurface formation.

FIG. 24 is a block diagram of another embodiment of a method for determining a downhole parameter from a subsurface formation.

DETAILED DESCRIPTION OF THE INVENTION AND THE PREFERRED EMBODIMENT

Figure 1:
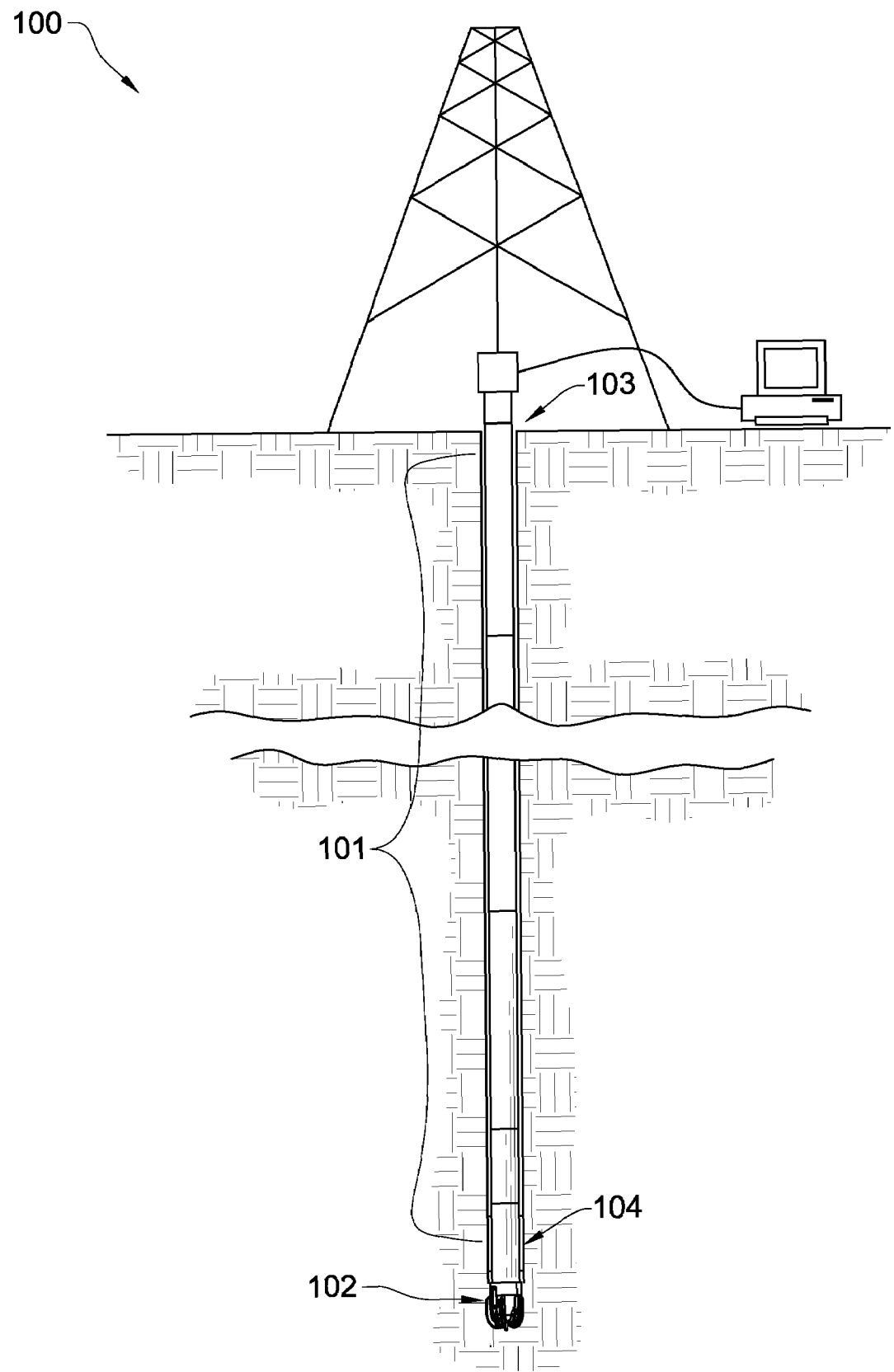
FIG. 1 is a cross-sectional perspective diagram of an embodiment of a drill site.

Referring now to the drawings, FIG. 1 is a diagram of a drill site, which includes a system 100 for retrieving a downhole data parameter. The system 100 comprises a drill string 101 intermediate a drill bit assembly 102 and a surface of the earth 103. Drill collars and/or heavy weight pipe 104 may be attached at the bottom of the drill string 101 to provide weight on the drill bit assembly 102.

Figure 2:
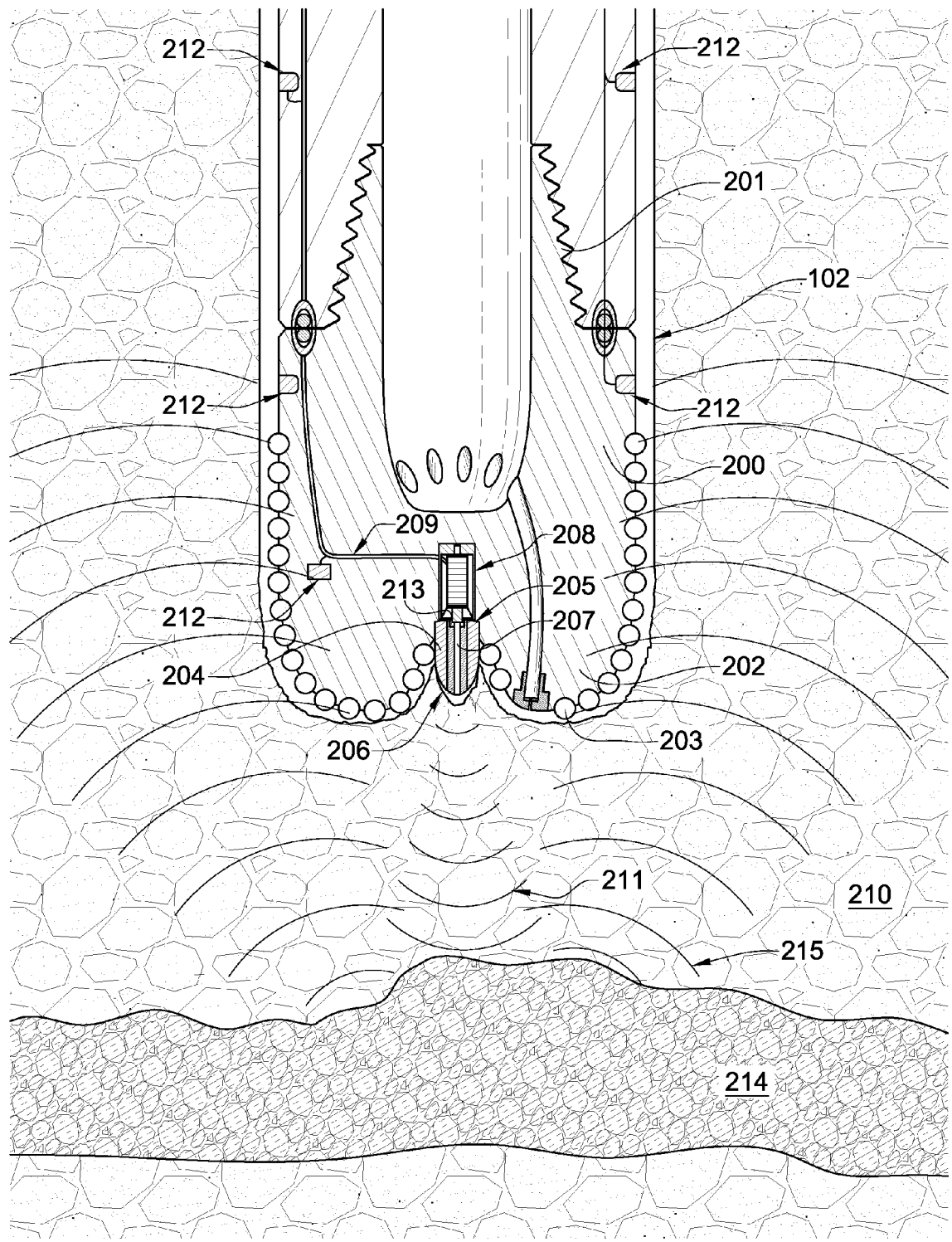
FIG. 2 is a cross-sectional diagram of an embodiment of a drill bit assembly.

In the embodiment of FIG. 2 a drill bit assembly 102 may comprise a body portion 200 intermediate a shank portion 201 and a working portion 202. The working portion 202 may comprise at least one cutting element 203. The drill bit assembly 102 comprises a shaft 204 comprising a proximate end 205 disposed within the drill bit assembly 102 and a distal end 206 protruding from the working portion 202. There may be at least one probe 207 disposed within the shaft 204. A proximate end 213 of the probe 207 may be attached to an actuator 208. The actuator 208 may comprise a hydraulic and/or an electric element 209, which is adapted to move the shaft and/or probe. In one embodiment the actuator 208 may comprise a smart material that expands or retracts based on an applied electric or magnetic field. Such smart materials may include magnetostrictive materials, electrostrictive materials such as lead magnesium niobate (PMN), piezoelectric materials and Electroactive Polymers.

In some embodiments, the probe may be considered an exploratory instrument supported within the shaft designed to determine at least one characteristics of a subsurface formation. The probe may comprise a length and be disposed within a passageway of the shaft. The outer diameter of the probe may comprise a low friction surface such that the probe may move without creating undue friction with the wall of the shaft's passageway.

The probe 207 and/or shaft 204 may be able to extend beyond the drill bit assembly 102 and contact a subsurface formation 210 or draw fluid from the formation. In one embodiment the actuator 208 may excite the probe 207 in such a manner that it vibrates against the subsurface formation 210 creating acoustics waves 211 within the formation 210. The acoustic waves 211 may be seismic waves, sonic waves, or combinations thereof. The drill bit assembly 102 may also include one or more sensor(s) 212 capable of receiving a seismic and/or sonic wave. The acoustic waves 211 generated by the probe may be reflected back towards the drill bit assembly 102 (or towards the surface of the earth or to another well bore) by an acoustic impedance boundary 214 in the formation 210. The sensor(s) 212 may then detect the reflected waves 215 and relay the data with a downhole network, or another telemetry system, to surface or local electronics for interpretation. It is believed that the data may be used to determine parameters of the formation 210 before drilling into it. In some embodiments, the speed at which the acoustic waves travel through the earth may reveal characteristics of the earth formations. By determining the characteristics of the earth it is believed that the position of hydrocarbon or other formations may be determined relative to the drill bit assembly. This may be essential since measurements of the earth formations taken before drilling may not as precise as what is possible with the present invention. In another embodiment the probe maybe used to draw/inject fluid from the formation and infer information about the formation fluid properties such as and not limited to, pressure, viscosity, and density. This may be valuable for detecting high or low pressure regions in the formation 210 which may cause a blowout, damage downhole equipment, alter the drilling mud circulation, or damage the borehole. Precautions may then be taken to prevent these situations including but not limited to activating blow-out preventors, altering the weight of the drill mud, or installing casing in the borehole. The probe 207 may be useful in determining if the drill bit assembly 102 is about to drill into a hard formation, such as a granite formation, which may allow an operator to alter drilling so that minimal damage may be inflected to the cutting elements 203.

In some embodiment of the invention, the shaft 204 is adapted to rotate independent of the body portion 200 of the assembly 102. In other embodiments, the shaft 204 is brazed into a chamber formed in the body portion 200 and the shaft 204 protrudes out of the working portion 202 through an opening formed in the working portion 202. Yet in other embodiments, the shaft 204 is simply formed during manufacturing in the working portion 202. In yet other embodiment of the invention a portion of the shaft 204 is disposed within the drill bit assembly 102, the distal end protrudes beyond the working portion 202, and a proximate end of the shaft extends beyond the shank portion 201 of the assembly 102. In such embodiments, the proximate end of the shaft 204 may interact with actuators or other devices disposed within the drill string 101 connected to the drill bit assembly 102.

Figure 3:
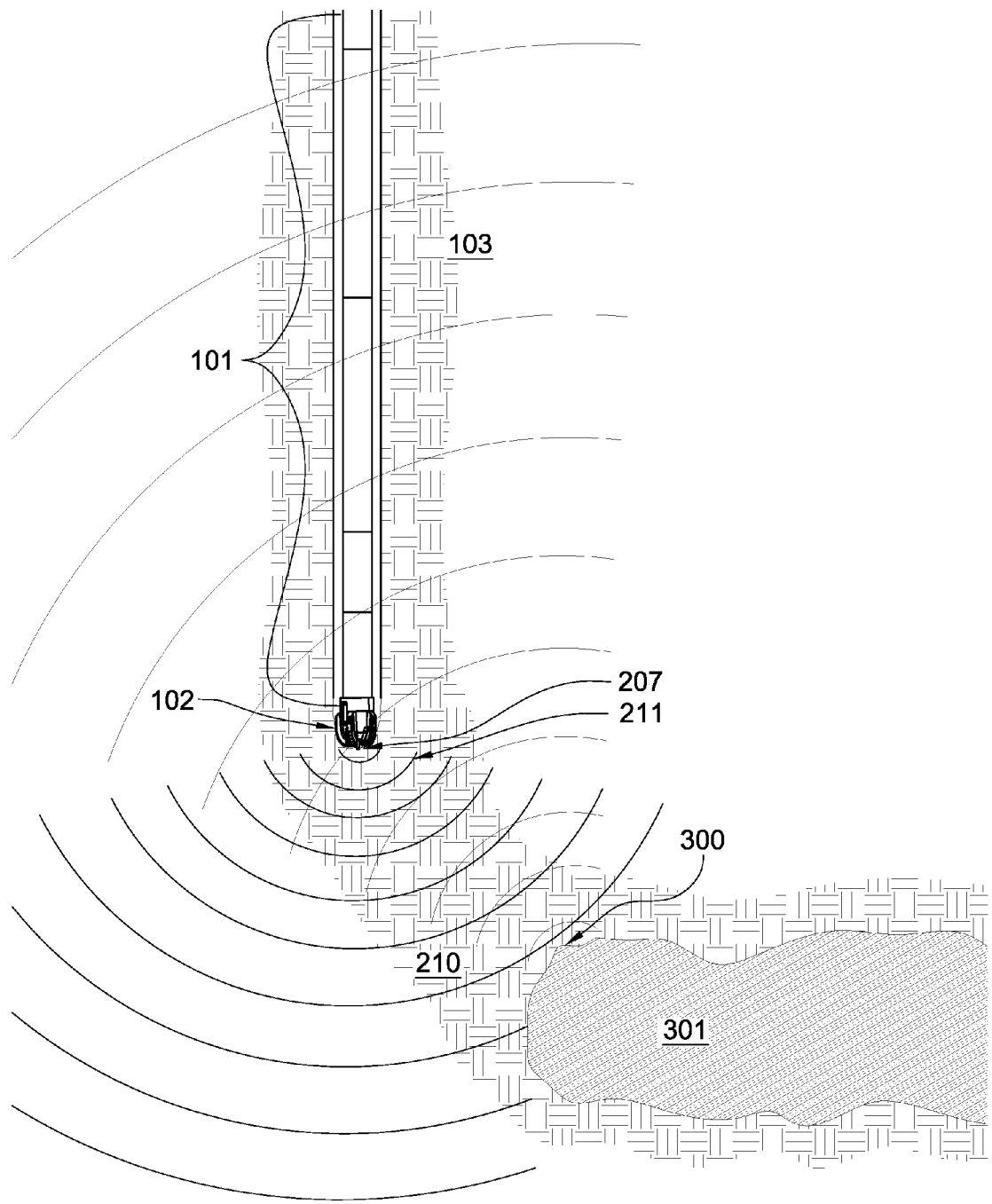
FIG. 3 is a cross-sectional perspective diagram of an embodiment of a drill string within the earth.

Referring now to FIG. 3, which is a cross-sectional perspective diagram of an embodiment of a drill string 101 within the earth 103. FIG. 3 diagrams an acoustic wave 211 originating from the probe 207 on the drill bit assembly 102. The wave 211 travels through the formation 210 until an acoustic impedance boundary 300 is reached at which it may be reflected. In one embodiment the acoustic impedance boundary 300 may occur at an oil or gas reservoir 301. If the drill string 101 is misaligned such that it will not reach the reservoir 301 under its current trajectory, a directional drilling operation may be taken to realign the drill string 101.

Figure 4:
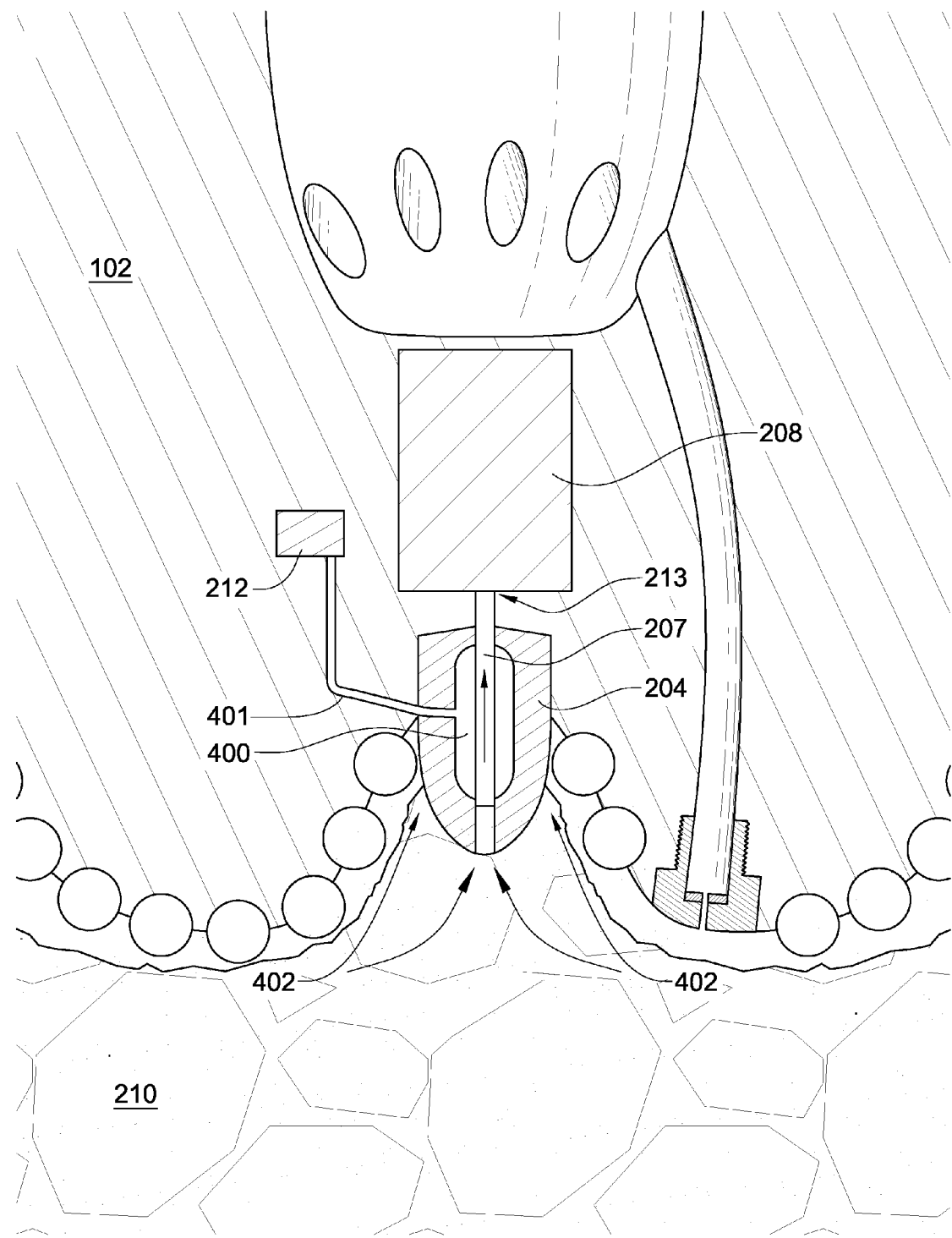
FIG. 4 is a cross-sectional diagram of an embodiment of a drill bit assembly with a probe disposed within a shaft.

FIG. 4 is a cross-sectional diagram of an embodiment of a drill bit assembly 102 with a probe 207 disposed within the shaft 204. The probe 207 of the present embodiment may be used in determining the pressure of the formation 210. The probe 207 may be attached to an actuator 208 on a proximate end 213. The shaft 204 may penetrate into the formation 210 so that the probe 207 is substantially in contact with the formation 210. The actuator 208 may retract the probe 207 within the shaft 204. This may induce fluid from the formation 210 to enter into a chamber 400 within the shaft 204 or inject fluid into the formation using the actuator 208 to push the probe within the shaft 204. The chamber 400 may comprise a pathway 401 to a sensor 212 where the pressure of the formation fluid may be measured. For accurate readings a mechanical seal 402 may be made around the shaft 204 such that the fluid entering the shaft 204 is not influence by the fluid within the annulus. The mechanical seal 402 may be formed by the compressive strength of the formation 210 resisting the weight loaded to the shaft 204 such that the annulus fluid prevented from entering into the chamber 400 of the shaft 204. An annulus pressure may also be taken with the current invention. This may be done by slightly raising the drill bit assembly 102, retracting the probe 207 and allowing fluid from the annulus to enter into the chamber 400 of the shaft 204. The sensor 212 in fluid communication with the chamber 400 may then measure the annulus pressure. One way of measuring the compressive strength of the formation 210 may include extending the probe 207 into the formation 210 with the actuator 208 and measuring the strain on the probe 207. Alternatively, the force required by the actuator 208 to force the probe 207 to penetrate into the formation 210 may be measured from which the compressive strength and/or density may be determined. In some embodiments, the probe 207 may be vibrated by a drilling action or a remote source (such as a source from the surface or from an adjacent well). The vibrations of the probe 207 may be measure by a piezoelectric or magnetostrictive element attached to the probe 207. Further the probe 207 may measure vibrations generated by fracturing the formation 210.

Figure 5:
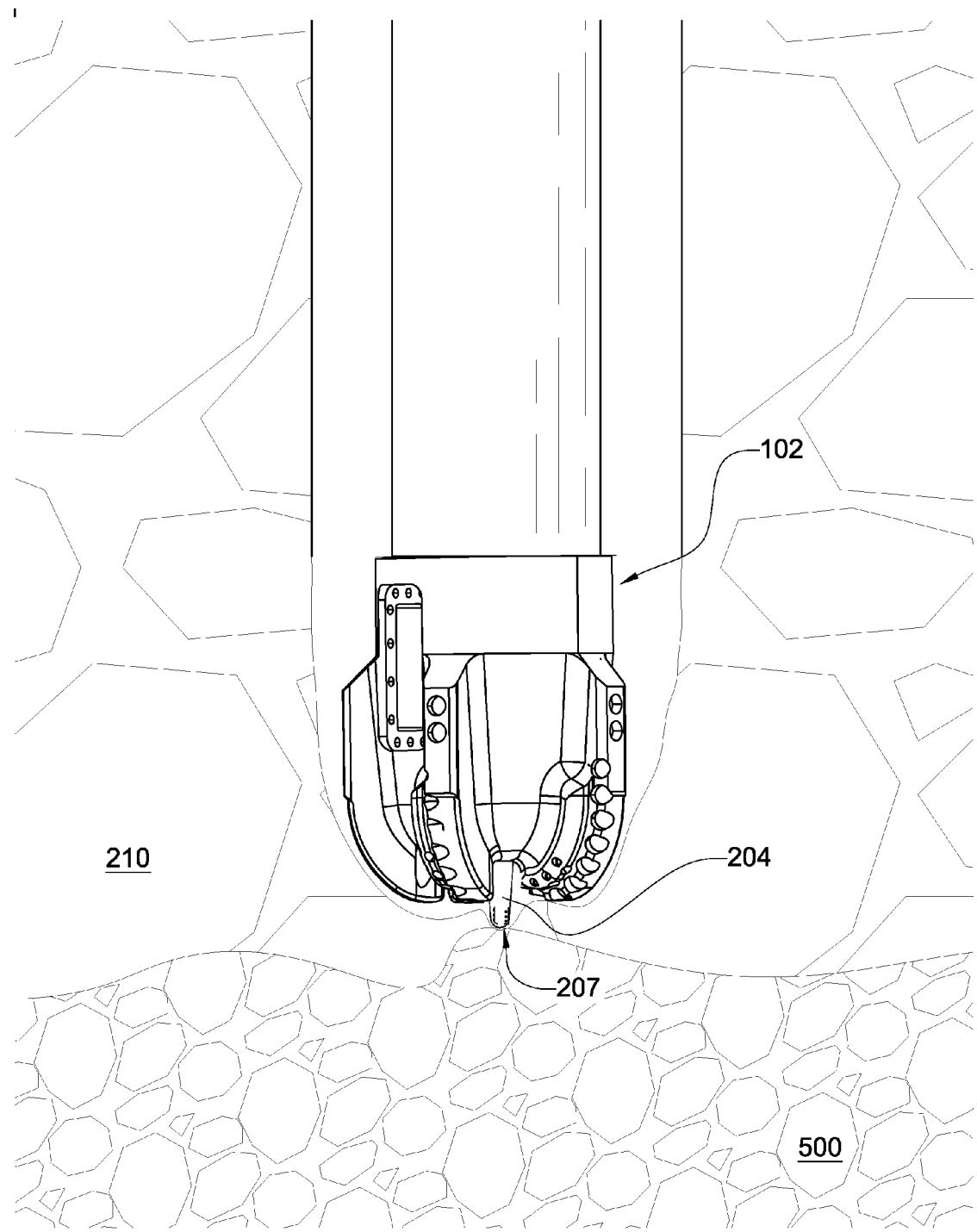
FIG. 5 is a cross-sectional perspective diagram of another embodiment of a drill bit assembly.

Referring now to FIG. 5, which is a cross-sectional perspective diagram of another embodiment of a drill bit assembly 102. In the current embodiment the shaft 204 may extend beyond the drill bit assembly 102. With the shaft 204 extended beyond the drill bit assembly 102 the probe 207 may be able to take a measurement of formations 500 ahead of the drill bit assembly 102 before the entire drill bit assembly 102 enters the formation 500. This may be valuable when the formation 500 ahead has a significantly different internal pressure than the current formation 210 being drilled. The probe 207 may sense the change in formation pressure and precautions may then be taken to prevent a potentially dangerous situation. In high pressure regions, blow outs may occur and in low pressure formations drilling mud may be lost into formation. In the prior art, such formation pressures were taken after the drill bit had already entered into formation 500.

Figure 6:
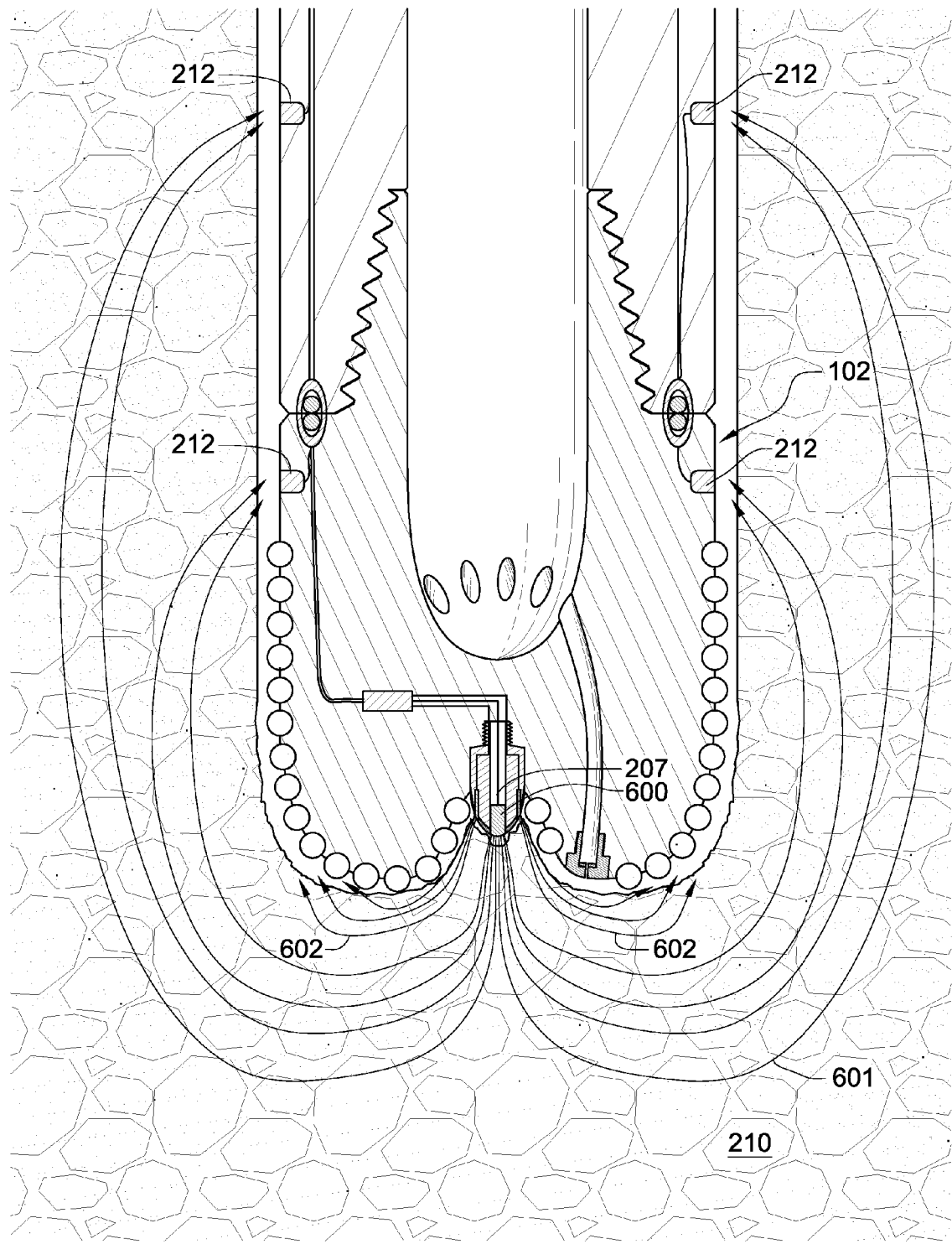
FIG. 6 is a cross-sectional diagram of another embodiment of a drill bit assembly.

FIG. 6 is a cross-sectional diagram of another embodiment of a drill bit assembly 102. The probe 207 may comprise or be in communication with a current source 600 that may directly pass or induce a current 601 into the formation 210. One or more bucking currents 602 may be emitted into the formation 210 around the current source 600 to insure that the current 601 is driven into the formation 210. The conductivity/resistivity of the formation 210 may then be determined by receiving the current 601 with one or more sensors 212. The knowledge of the resistivity of a formation can thus be a valuable for finding regions of high hydrocarbon content since hydrocarbons may have high resistivity and saline water may have low resistivity and so the proportion of hydrocarbons in a formation may be directly related to the resistivity.

Figure 7:
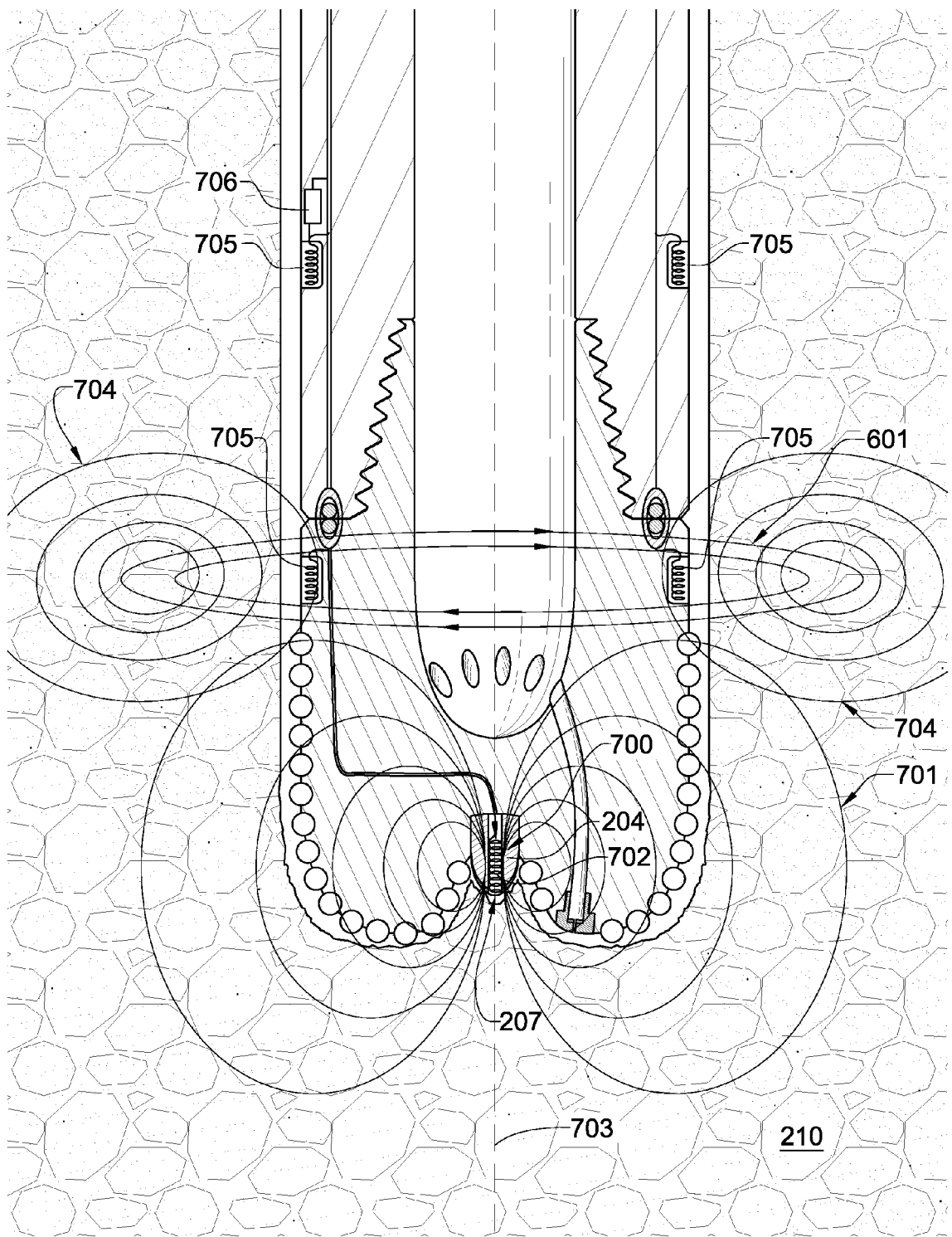
FIG. 7 is a cross-sectional diagram of another embodiment of a drill bit assembly.

Referring now to FIG. 7, the current 601 may be induced into the formation 210 with an induction tool 700 that generates a primary electromagnetic field 701 around the shaft 204 by passing current into a transmitter coil (or coils) 702 inside the probe 207. The primary field 701 may propagate into the formation 210 and generates a continuous current distribution 601 in the formation 210. This current distribution (eddy currents) 601 may be approximately coaxial with the borehole axis 703. The formation currents 601 may be phase-shifted 90° from the transmitter current in high-resistivity formations (a consequence of Lenz' Law). The formation currents 601 may set up a secondary electromagnetic field 704 that may be detected by one or more induction receiver coils 705. The phase of the received voltage may be shifted 90° from the formation currents 601, making a total phase shift of 180°. The received voltage may be proportional to the formation conductivity. Since the receiver voltage should be approximately 180° out of phase with the transmitter current, a phase-sensitive detector circuit 706 referenced to the transmitter current may separate the received signal from the noise.

Figure 8:
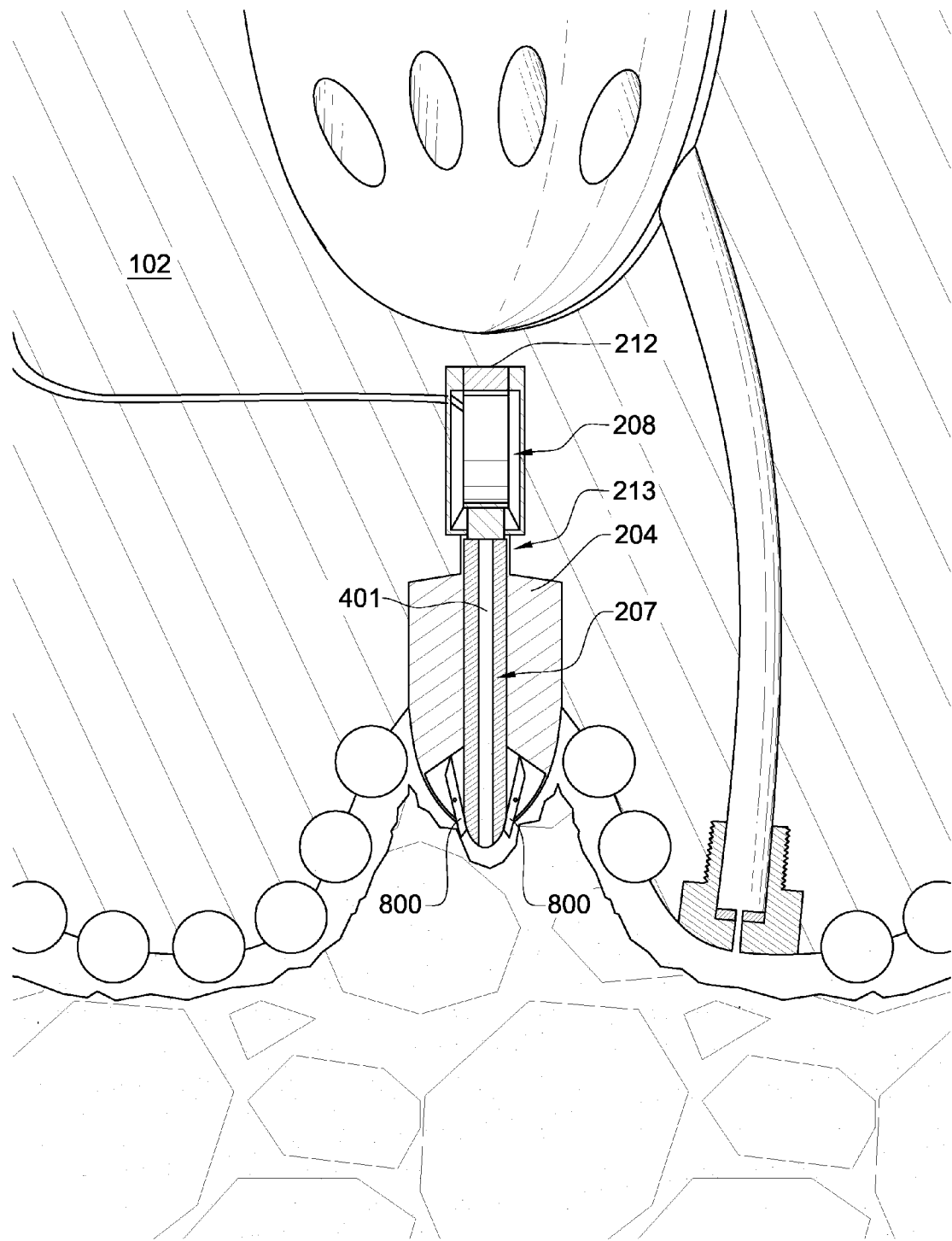
FIG. 8 is a cross-sectional diagram of another embodiment of the drill bit assembly with a probe disposed within a shaft.

In the embodiment of FIG. 8 the drill bit assembly 102 comprises a probe 207 disposed within a shaft 204. The proximate end 213 of the probe 207 may be attached to an actuator 208 comprising a sensor 212. The probe 207 may comprise a pathway 401 for the formation fluid to flow to the sensor 212. One or more hinged panels 800 may be pivotally fixed to the shaft 204 to prevent debris from entering into the pathway 401 of the probe 207. When the probe 207 is in the retracted position (not shown) the panels 800 may seal the pathway 401 of the probe 207. When the probe 207 is in an extended position the pathway 401 may be in communication with fluid of the formation. The sensor 212 may then be able to take a reading of the formation pressure.

Figure 9:
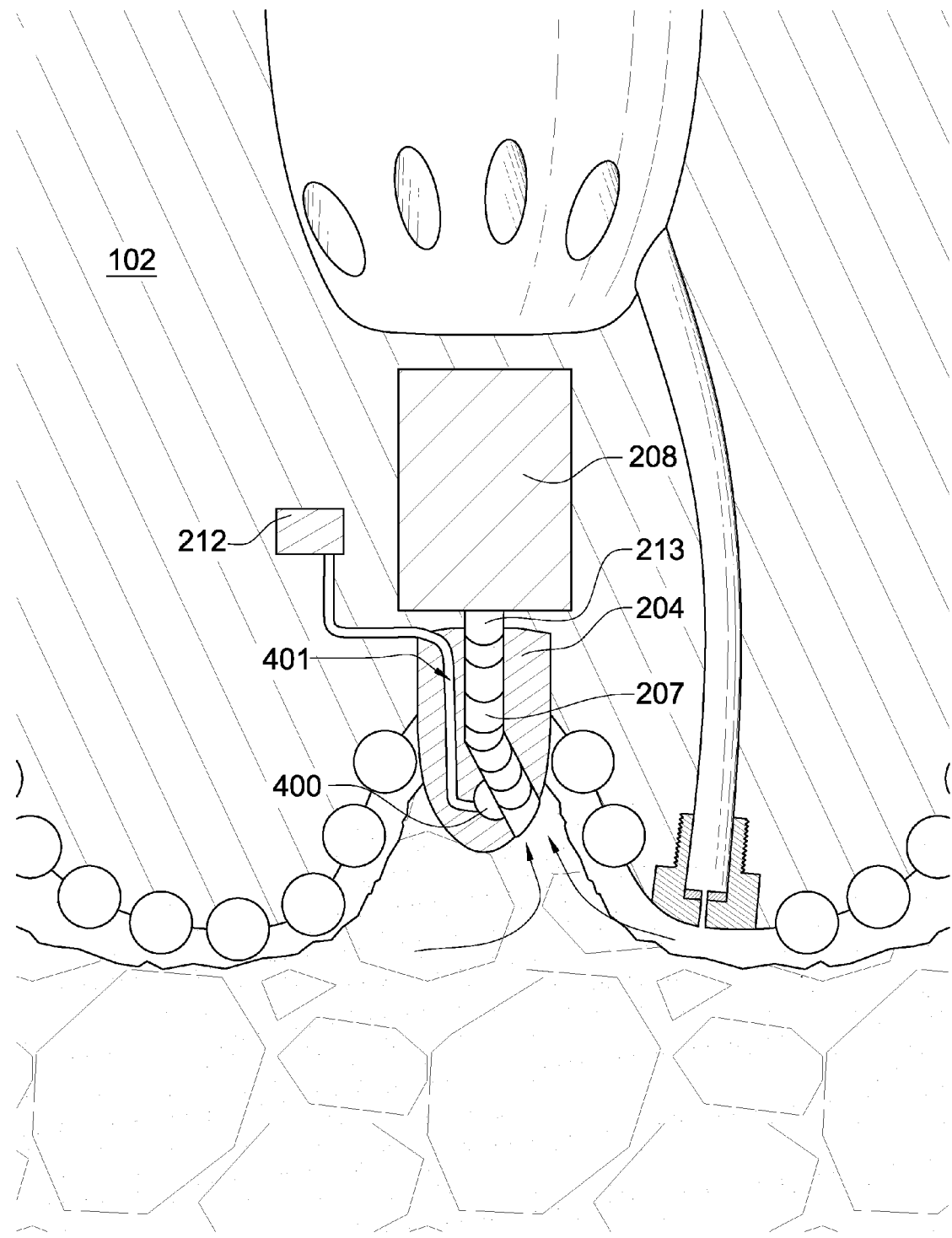
FIG. 9 is a cross-sectional diagram of another embodiment of the drill bit assembly with a probe disposed within a shaft.

FIG. 9 is a cross-sectional diagram of another embodiment of the drill bit assembly 102 with a probe 207 disposed within the shaft 204. The probe 207 may comprise a plurality of segments and be adapted to maneuver around corners in the assembly 102. In this and in straight solid probe embodiments, the probe may exit the shaft 204 through a port that does not fall on a central axis of the assembly 102. An off center port may be desirable since the weight of the drill string may be loaded to the center of the shaft 204. An actuator 208 attached to a proximate end 213 of the probe 207 may allow the probe 207 to be retracted into the shaft 204. The shaft 204 may also comprise a chamber 400 with a pathway 401 to a sensor 212. As the probe 207 is retracted into the shaft 204, fluid from the formation may enter into the chamber 400 and be in communication with the sensor 212. A reading may then be taken of the formation pressure.

Figure 10:
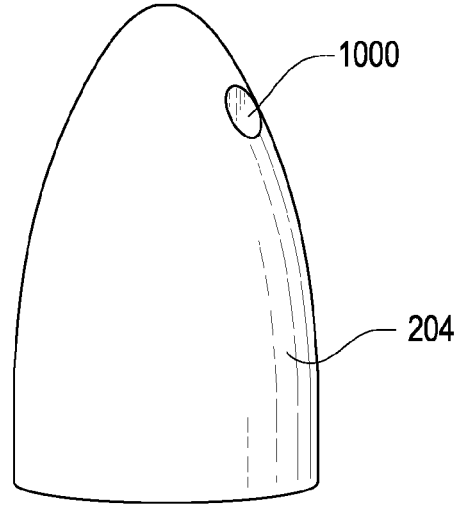
FIG. 10 is a perspective diagram of an embodiment of a shaft.
Figure 11:
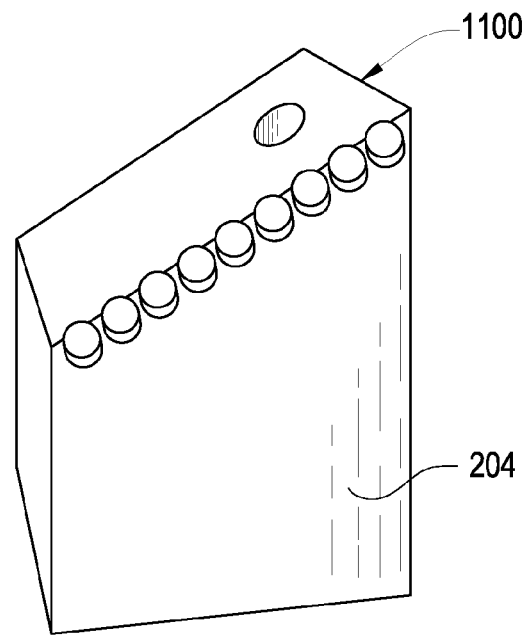
FIG. 11 is a perspective diagram of another embodiment of a shaft.
Figure 12:
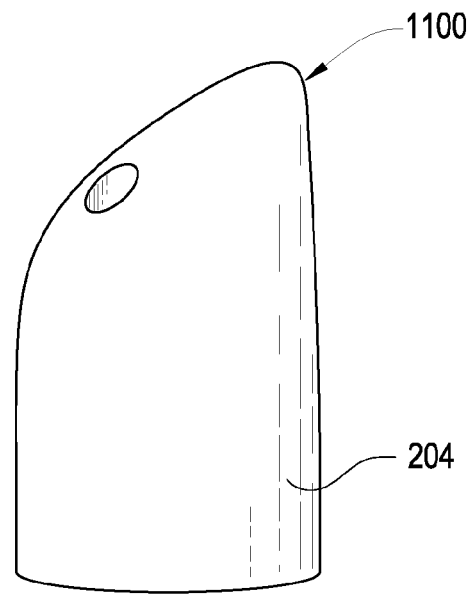
FIG. 12 is a perspective diagram of another embodiment of a shaft.
Figure 13:
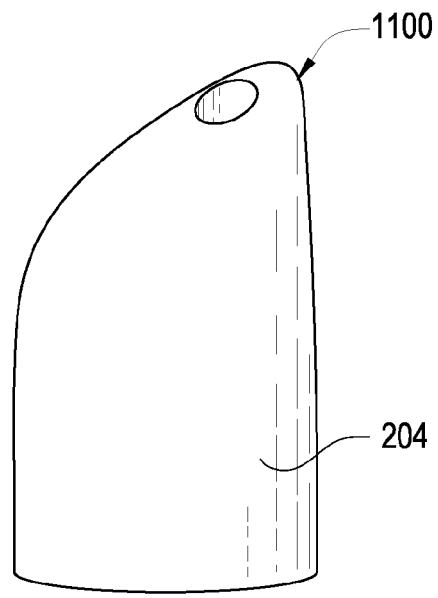
FIG. 13 is a perspective diagram of another embodiment of a shaft.

FIGS. 10-13 are perspective diagrams of embodiments of distal ends of the shaft 204. FIG. 10 diagrams an embodiment with a probe port 1000 being slightly of center in a conical shaped distal end of the shaft 204. FIG. 11 is an alternative embodiment of a shaft 204 that may be useful for directional drilling. The distal end of the shaft comprises an asymmetric geometry comprising a tip 1100 and a plurality of cutting elements. The cutting elements may be made of polycrystalline diamond and/or of cubic boron nitride. Electronics and/or hydraulics may be used to correctly position asymmetric geometry against the formation 210 such that the directional drilling may be controlled. FIGS. 12 and 13 show alternate embodiments of rounded shafts 204 with off centered tips 1100. In the embodiment of FIG. 12, the probe may be disposed within the shaft 204 at an angle or it may be disposed substantially coaxial with the shaft 204.

Figure 14:
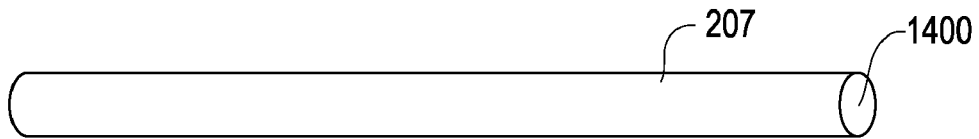
FIG. 14 is a perspective diagram of an embodiment of a probe.
Figure 14A:
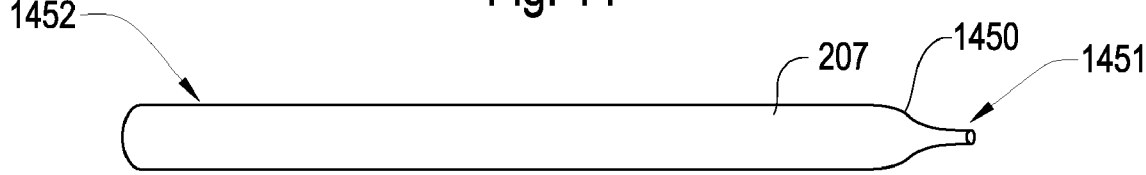
FIG. 14a is perspective diagram of another embodiment of a probe.
Figure 15:
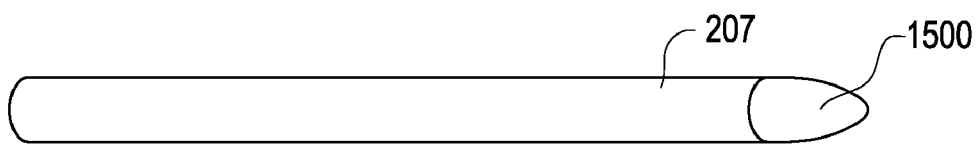
FIG. 15 is a perspective diagram of another embodiment of a probe.
Figure 16:
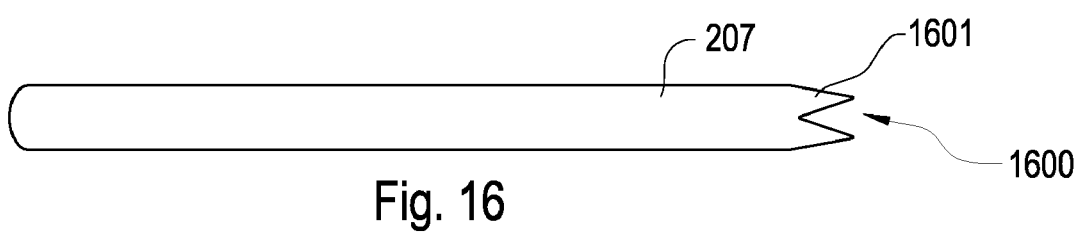
FIG. 16 is a perspective diagram of another embodiment of a probe.
Figure 17:
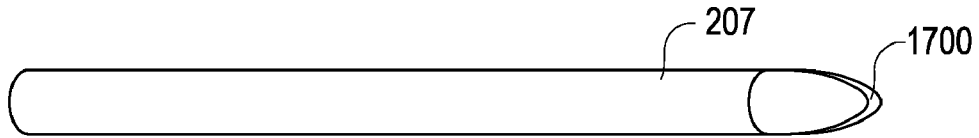
FIG. 17 is a perspective diagram of another embodiment of a probe.
Figure 18:
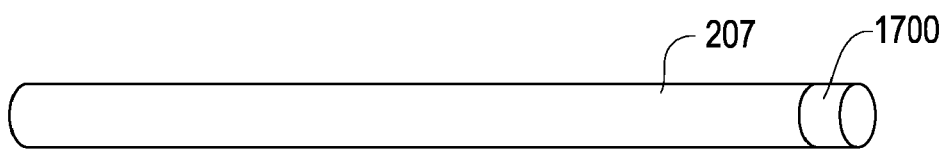
FIG. 18 is a perspective diagram of another embodiment of a probe.
Figure 19:
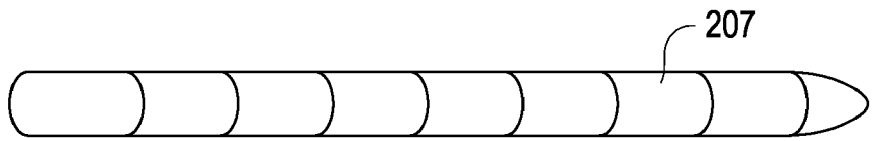
FIG. 19 is a perspective diagram of another embodiment of a probe.

FIGS. 14-19 are perspective diagrams of embodiments of a probe 207. FIG. 14 diagrams a probe 207 with a flat tip 1400. FIG. 14*a* diagrams a probe 207 with varying diameters such that a transition region 1450 lies between a first and second diameter 1451, 1452. This may be desirable so that the length of the probe 207 may withstand a higher compression, while the distal end of the probe 207 may be able to focus the weight loaded to it directly ahead into the formation. In some embodiments it may be desirable to have several transition regions distributed throughout the probe 207. Some of the transition regions may be more extreme than other. In other embodiments, the probe 207 may taper at the distal end or may comprise a gradual taper over the length of the probe 207. FIG. 15 diagrams a probe with a conical tip 1500. FIG. 16 is an embodiment of a probe 207 with a tip 1600 comprising multiple spikes 1601. In one embodiment the probe 207 may comprise a diamond or other durable coating 1700 on the tip 1600 such as seen in FIGS. 17 and 18. This may provide strength and durability to the probe 207. In one embodiment the probe 207 may be flexible such as that seen in FIG. 19. This may allow the probe 207 to bend within the shaft 204 such as described in FIG. 9. The probe 207 may be made of a durable material such as carbide, diamond, cubic boron nitride, titanium, steel, or combinations thereof. In some embodiments, the durable coating, such as diamond, may be sintered or brazed to the end of the probe 207. Further the durable coating may comprise a leeched region within the vicinity of the portion of the probe 207 that will contact the subsurface formations.

Figure 20:
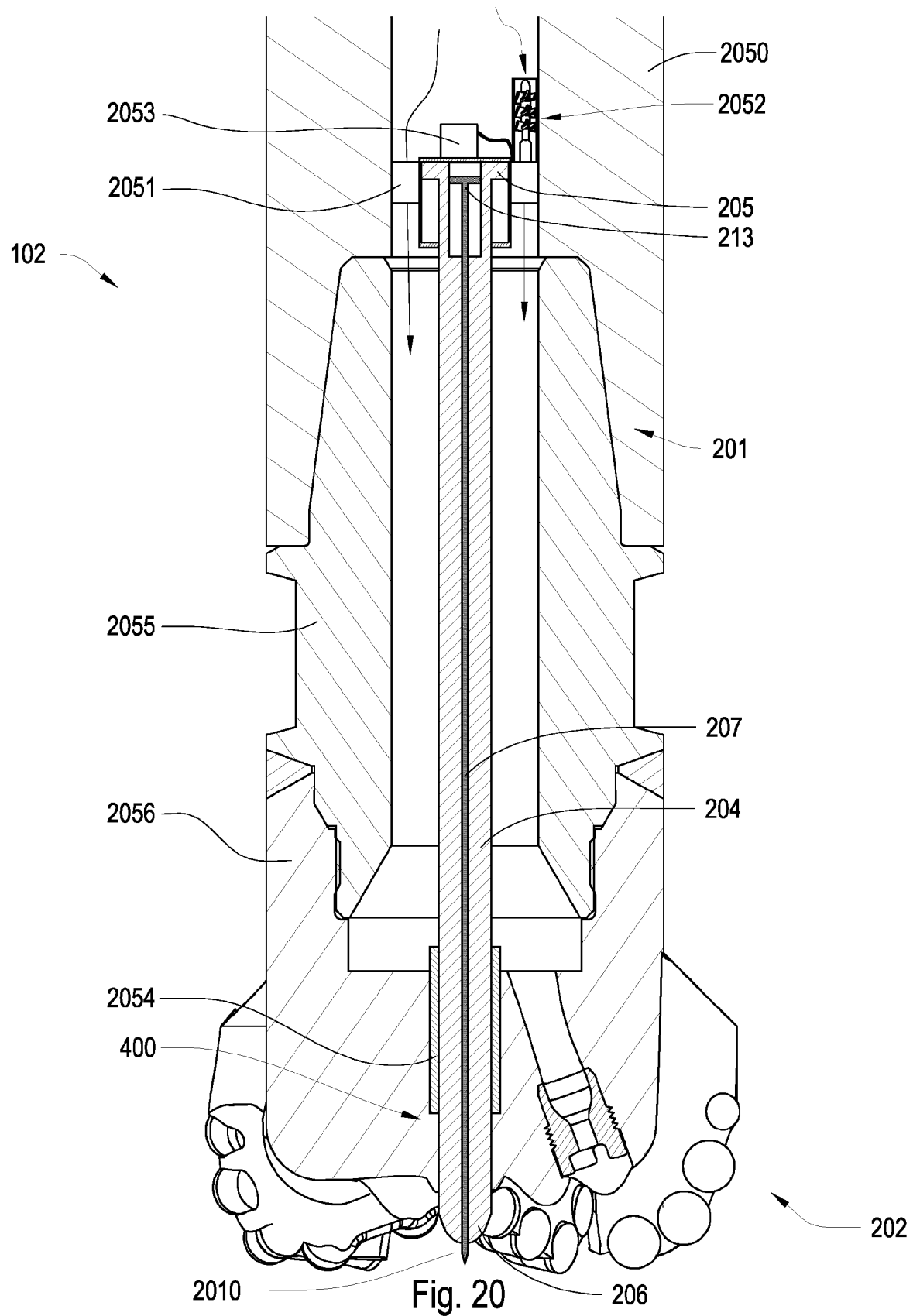
FIG. 20 is a cross sectional diagram of another embodiment of the drill bit assembly.

FIG. 20 is cross sectional diagram of another embodiment of a drill bit assembly 102. In this embodiment, the distal ends 206, 2010 of the shaft 204 and probe 207 extend beyond the working portion 202 of the assembly 102 and the proximate ends 205, 213 of the shaft 204 and probe 207 extend beyond the shank portion 201 of the assembly 102. A support 2051 secured in a downhole tool string component 2050 located just above the assembly 102 holds the proximal end 213 of the shaft 204. The support 2051 is adapted to allow fluid, such as drilling mud, to flow around it. A turbine 2052 connected to a pump 2053 may drive a hydraulic circuit which is used to move both the shaft 204 relative to the drill bit assembly 102 and also to move the probe 207 relative to the shaft 204. In other embodiments, a solenoid or a battery controlled device may drive the hydraulic circuit. A bearing 2054 located in the chamber 400 disposed within the body portion 200 of the assembly 102 stabilizes the shaft 204. In some embodiments of the invention, the sensors that are in communication with the probe 207 are disposed within a tool string component located above the drill bit assembly 102. In the embodiment shown in FIG. 20, the body portion 200 is made of two parts 2055, 2056 and welded together.

FIG. 21 is a block diagram of an embodiment of a method 2000 for downhole data retrieval. The method 2000 includes providing 2001 a drill bit assembly having a body portion intermediate a shank portion and a working portion; providing 2002 a shaft comprising an end substantially protruding from the working portion and the shaft also having at least one probe; using 2003 the probe to determine downhole parameters.

FIG. 22 is a block diagram of an embodiment of a method 2100 for determining a downhole parameter from a subsurface formation. The method 2100 includes providing 2101 a drill bit assembly with a shaft comprising an end substantially protruding from a working portion and the shaft also having at least one probe; isolating 2102 the probe from the annulus pressure by forming a mechanical seal with the shaft and a subsurface formation; retrieving 2103 a sample of the formation by retracting the probe within the shaft; and, analyzing 2104 the sample within the shaft with at least one sensor.

FIG. 23 is a block diagram of an embodiment of a method 2200 for determining a downhole parameter of a subsurface formation. The method 2200 includes providing 2201 a drill bit assembly with a shaft comprising an end substantially protruding from a working portion and the shaft also having at least one probe; engaging 2202 a subsurface formation with the probe; generating 2203 at least one acoustic wave in the formation by vibrating the probe against the formation; receiving 2204 a reflected portion of the wave with at least one sensor in communication with the downhole tool string.

FIG. 24 is a block diagram of another embodiment of a method 2300 for determining a downhole parameter from a subsurface formation. The method 2300 includes providing 2301 a drill bit assembly with a shaft comprising an end substantially protruding from a working portion and the shaft also having at least one probe; electrically isolating 2302 at least a portion of the probe from the drill bit assembly; forcing 2303 a current into the subsurface formation through the probe; receiving 2304 the current with at least one sensor in communication with the downhole tool string.

Whereas the present invention has been described in particular relation to the drawings attached hereto, it should be understood that other and further modifications apart from those shown or suggested herein, may be made within the scope and spirit of the present invention.

What is claimed is:

1. A drill bit assembly, comprising:
   a body portion intermediate a shank portion and a working portion;
   the working portion comprising at least one cutting element;
   a shaft with a distal end protruding from the working portion; and
   at least one probe disposed within the shaft, the at least one probe being adapted to move with respect to the shaft.

2. The drill bit assembly of claim 1, wherein the probe is extendable from the shaft.

3. The drill bit assembly of claim 1, wherein the probe engages a subsurface formation.

4. The drill bit assembly of claim 1, wherein a proximate end of the probe is attached to an actuator.

5. The drill bit assembly of claim 1, wherein an actuator excites the probe to produce an acoustic wave, seismic wave, sonic wave, or combinations thereof.

6. The drill bit assembly of claim 1, further comprising a sonic receiver, acoustic receiver, seismic receiver or combinations thereof.

7. The drill bit assembly of claim 1, wherein the probe comprises a fluid channel.

8. The drill bit assembly of claim 7, further comprising a sensor disposed proximate the fluid channel and in fluid communication with a subsurface formation.

9. The drill bit assembly of claim 1, wherein the probe is substantially coaxial with the shaft.

10. The drill bit assembly of claim 1, wherein the probe is electrically isolated from the shaft, body portion, working portion, and/or a resistivity sensor.

11. A method of downhole data acquisition comprising the steps of:
    providing a drill bit assembly having a body portion intermediate a shank portion and a working portion;
    providing a shaft comprising an end protruding from the working portion and the shaft also having at least one probe, the at least one probe being adapted to move with respect to the shaft; and
    using the probe to determine downhole parameters.

12. The method of claim 11, wherein a proximate end of the probe is attached to an actuator.

13. The method of claim 11, wherein an actuator sends acoustic, seismic, and/or sonic signals into the formation through the probe.

14. The method of claim 11, wherein acoustic, sonic, and/or seismic reflections are received from the formation by a sensor.

15. The method of claim 11, wherein the probe contacts the subsurface formation within a mechanical seal formed between the subsurface formation and the shaft.

16. The method of claim 11 wherein the probe is adapted to draw fluid from the subsurface formation.

17. The method of claim 11, wherein the probe is adapted to measure a pressure of an annulus within a borehole.

18. A system, comprising:
    a drill bit assembly attached to a string of downhole components;
    the drill bit assembly comprising a body portion intermediate a shank portion and a working portion;
    the working portion comprising at least on cutting element;
    a shaft with a distal end protruding from the working portion; and
    at least one probe disposed within the shaft, the at least one probe being adapted to move with respect to the shaft.

19. The system of claim 18, wherein the probe is extendable from the shaft.

20. The system of claim 18, wherein the probe engages a subsurface formation.

21. The system of claim 18, wherein the probe is adapted to generate acoustic waves and/or senses formation pressure.

22. The system of claim 18, wherein the probe is electrically isolated from the shaft, body portion, working portion, and/or a resistivity sensor.

* * * * *